(12) United States Patent
Zinin (10) Patent No.: US 9,621,625 B2
(45) Date of Patent: Apr. 11, 2017

(54) METHOD AND SYSTEM FOR CORRELATION OF INTERNET APPLICATION DOMAIN IDENTITIES AND NETWORK DEVICE IDENTIFIERS

(71) Applicant: Cinarra Systems Pte. Ltd., Singapore (SG)

(72) Inventor: Alexey D. Zinin, Santa Clara, CA (US)

(73) Assignee: Cinarra Systems, Singapore (SG)

( * ) Notice: Subject to any disclaimer, the term of this patent is extended or adjusted under 35 U.S.C. 154(b) by 140 days.

(21) Appl. No.: 14/329,605

(22) Filed: Jul. 11, 2014

(65) Prior Publication Data

US 2015/0019721 A1 Jan. 15, 2015

Related U.S. Application Data

(60) Provisional application No. 61/845,331, filed on Jul. 11, 2013.

(51) Int. Cl.
*G06F 15/177* (2006.01)
*G06F 15/16* (2006.01)
*G06F 15/173* (2006.01)
*H04L 29/08* (2006.01)
*H04L 29/12* (2006.01)

(52) U.S. Cl.
CPC ........ *H04L 67/02* (2013.01); *H04L 29/12028* (2013.01); *H04L 61/10* (2013.01); *H04L 61/103* (2013.01); *H04L 61/2015* (2013.01); *H04L 67/16* (2013.01)

(58) Field of Classification Search
CPC ............. H04L 61/103; H04L 29/12028; H04L 61/2015; H04L 29/12018; H04L 61/10

USPC ........................................ 709/221, 245, 238
See application file for complete search history.

(56) References Cited

U.S. PATENT DOCUMENTS

| | | | | |
|---|---|---|---|---|
| 2006/0149844 | A1* | 7/2006 | Droz | H04L 29/1216 709/227 |
| 2008/0065774 | A1* | 3/2008 | Keeler | G06F 17/30528 709/227 |
| 2011/0265116 | A1* | 10/2011 | Stern | H04L 12/2801 725/35 |
| 2012/0014316 | A1* | 1/2012 | Rahman | H04W 40/36 370/328 |
| 2012/0116838 | A1* | 5/2012 | Bisdikian | G06Q 10/10 705/7.28 |
| 2012/0278161 | A1* | 11/2012 | Lazzaro | G06Q 30/0251 705/14.45 |
| 2012/0316992 | A1* | 12/2012 | Oborne | G06Q 30/06 705/26.41 |
| 2013/0121252 | A1* | 5/2013 | Peng | H04L 61/106 370/328 |
| 2013/0124309 | A1* | 5/2013 | Traasdahl | H04L 67/22 705/14.49 |

(Continued)

*Primary Examiner* — Hieu Hoang
(74) *Attorney, Agent, or Firm* — Goodwin Procter LLP (57) ABSTRACT

System and methods for determining a relationship between an application-level identifier and a network-level identifier are provided. In one implementation, a discovery server receives a data request that includes an application-level identifier and a transitory network-level identifier. Based on the transitory network-level identifier, the discovery server determines a stable network-level identifier, and further maps the application-level identifier to the stable network-level identifier.

16 Claims, 3 Drawing Sheets

(56) References Cited

U.S. PATENT DOCUMENTS

| | | | |
|---|---|---|---|
| 2013/0173788 A1* | 7/2013 | Song | H04L 12/4633 709/224 |
| 2013/0288668 A1* | 10/2013 | Pragada | H04W 12/06 455/426.1 |
| 2014/0032727 A1* | 1/2014 | Kano | H04L 49/552 709/223 |
| 2014/0059192 A1* | 2/2014 | Miklos | H04W 8/082 709/221 |
| 2014/0258434 A1* | 9/2014 | Hong | H04W 4/14 709/206 |
| 2015/0089061 A1* | 3/2015 | Li | H04L 61/1511 709/226 |
| 2015/0113564 A1* | 4/2015 | Mushikabe | H04N 21/4126 725/37 |

\* cited by examiner

METHOD AND SYSTEM FOR CORRELATION OF INTERNET APPLICATION DOMAIN IDENTITIES AND NETWORK DEVICE IDENTIFIERS

CROSS-REFERENCE TO RELATED APPLICATION

This application claims priority to and the benefit of U.S. Provisional Patent Application No. 61/845,331, filed on Jul. 11, 2013, and entitled "Method And System For Correlation Of Internet Application Domain Identities And Network Device Identifiers," the entirety of which is incorporated by reference herein.

BACKGROUND

Field of Innovation

This invention is generally related to interworking between internet applications, such as web services and mobile apps, and telecommunication provider networks and services for the purpose of establishing a relationship between user identities in those domains. Established relationships can be further utilized by telecommunication providers, application platforms, and other parties to provide improved services to the end users. As a non-limiting example, such relationships may be used to improve targeting of mobile and web advertisements using information inside telecommunications provider networks and systems.

DESCRIPTION OF THE RELATED ART

Application-Level Identifiers

Developers of internet applications, such as web services and mobile apps (e.g., Apple iOS or Android OS applications) consistently strive to provide a personalized experience to their end users by equipping the applications with the ability to store user-specific settings or user preferences. Applications utilize different mechanisms to achieve this goal: web applications use the Hypertext Transfer Protocol (HTTP) cookie mechanism (HTTP Cookie), mobile apps make use of persistent device or user identifiers such as universally unique identifier (UUID), open device identification number (ODIN), or Identifier for Advertisers (IFA). While different in implementation, the above methods rely on the property that a certain unique piece of data that is associated with a particular user (or an application initiated by the user) remains consistent for a sufficient duration of time, and is exchanged by the involved parties (e.g., the web browser and the web server, or the mobile application and the mobile back-end server) for the purpose of identifying the user. These application-level identities can be utilized exclusively by the applications or may be passed on to other components for the purpose of providing the user with customized data. As a non-limiting example, a web page that includes a web advertisement may pass the user-associated cookie to the web advertising platform for the purpose of selecting the most relevant ad for the particular user. Similarly, a mobile application that integrates with a mobile ad platform may pass the associated universal device identifier (UDID), or OpenUDID, to the advertising platform for the purpose of ad targeting. Applications may use the above identifiers in a similar fashion to select more relevant content (e.g., music or video) for the end user.

Network-Level Identifiers

Telecommunication providers typically operate with the user devices at a lower level, such as the mobile network (e.g., Wi-Fi, or Global System for Mobile Communications (GSM)/Universal Mobile Telecommunications System (UMTS) network) providing connectivity at the physical level, or at the network level, such as an Internet Protocol (IP) network, by providing transport capabilities to Internet and mobile applications. Providers' networks are typically concerned with network-level device identifiers (such as Media Access Control (MAC) addresses, International Mobile Subscriber Identity (IMSI), International Mobile Station Equipment Identity (IMEI), or IP addresses), and do not have direct visibility of application-level identifiers discussed earlier. The role of the provider's network for the applications is to deliver data packets from one device to another using routing and switching mechanisms that utilize network-level identifiers to identify a particular device. Network-level identifiers are also used by provider networks to perform mobility management purposes and consolidate accounting and billing information.

Need for Mapping between Application and Network Identities

Clear separation of responsibilities between telecommunication providers and application platforms has its advantages, such as improved scalability (since the provider networks need only be aware of devices, and not all applications running on them), as well as privacy (providers normally do not know which specific applications are installed and utilized by the users). However, a number of cases have recently arisen in which the ability of applications and provider systems to interwork would present particular advantages to the end user. As a specific example, enabling a mobile network provider to help advertising platforms better target advertisements by utilizing, for example, location and statistical information about its subscribers would benefit the end users, as it would minimize delivery of unrelated ads. For a provider to participate in the ad targeting process (or any other process requiring understanding of the application-level identities), there needs to be a mechanism to establish a relationship between application-level identities and network-level device identifiers. Such a mapping would allow utilization of provider intelligence about devices at the application level.

SUMMARY

An object of the present invention is to provide systems and methods that provide for establishing a mapping between an application-level identity and a network-level device identifier. As a non-limiting example, such application-level identity can be represented as an HTTP cookie associated with a specific user session, or a unique device or application identifier utilized by a mobile application, while a network-level device identifier can be represented by an IPv4 or IPv6 address, MAC-address, mobile IMSI or IMEI, or any other identifier utilized by a telecommunications provider.

Another object of the present invention is to provide systems and methods that enable the above mapping via a discovery process whereby either (a) a normal protocol request from the application executing on the client device (for example web page code in the browser or a mobile application on a smartphone) is redirected to a specialized Discovery Server operating inside the provider network, or (b) an additional protocol request to the Discovery Server is initiated by the application.

Another object of the present invention is to provide systems and methods that redirect a normal protocol request via a special Domain Name System (DNS) configuration (or another type of network configuration) that resolves the symbolic name of the target server to the IP address of the Discovery Server hosted within the provider network. The Discovery Server completes the process by relaying the original request to the destination server in a proxy-like manner.

Another object of the present invention is to provide systems and methods that redirect a normal protocol request by participating in the application's data query process and returning a Uniform Resource Locator (URL) that resolves at the Discovery Server.

Another object of the present invention is to provide systems and methods that trigger an additional protocol request for Hypertext Markup Language (HTML)-enabled applications (applications rendering visual content described in HTML) via an additional HTML element resulting in an additional HTTP request, commonly known as a "web beacon" targeted at the HTTP-enabled Discovery Server inside a provider's network.

Still another object of the present invention is to provide systems and methods that insert the additional HTML element by providing the application with HTML content directly. As non-limiting examples, the application may request content descriptions for music, movies, advertisements, etc., and the system may return HTML content that results in an additional protocol request to the Discovery Server.

Yet another object of the present invention is to provide systems and methods for inserting the additional HTML element indirectly by providing HTML content indirectly via a real-time interface to the application-specific data platform.

Another object of the present invention is to provide systems and methods for inserting HTML code specifically via an interface to a general mobile advertising platform (including supply-side, demand-side, horizontal, and the like).

Another object of the present invention is to provide systems and methods for inserting HTML code specifically via an interface to a mobile advertising exchange platform.

Another object of the present invention is to provide systems and methods that include the original application-level identifier that needs to be mapped to a network identifier in the data request sent to the Discovery Server.

Another object of the present invention is to provide systems and methods for encoding the application level id in the HTTP request as either a URL argument or in the data-element name.

Yet another object of the present invention is to provide systems and methods for catching the request by the Discovery Server, capturing the source IP address of the application, and registering the app-id-to-IP-address mapping.

Another object of the present invention is to provide systems and methods for obtaining an IP-address-to-device-identifier mapping by analyzing the IP address allocation information.

Another object of the present invention is to provide systems and methods for obtaining an IP-address-to-device-identifier mapping by processing specifically Dynamic Host Configuration Protocol (DHCP) and Authentication, Authorization and Accounting (AAA) transaction records.

Yet another object of the present invention is to provide systems and methods for final mapping of application-level identity to device identifier via the IP address.

Accordingly, in one aspect, a system for determining a relationship between an application-level identifier and a network-level identifier includes a discovery server having a memory storing computer-executable instructions and a processor for executing the instructions. The execution of the instructions programs the server to receive a data request that includes an application-level identifier and a transitory network-level identifier, and to determine a stable network-level identifier based on the transitory network-level identifier. The server further maps the application-level identifier to the stable network-level identifier. Other embodiments of the invention include corresponding methods and computer programs.

In one implementation, the system further includes an application integration agent for providing content to an application platform. The content can include a reference to an external server, and the reference to the external server can resolve to an address associated with the discovery server. The system can also relay the data request to the external server.

In another implementation, the system further includes an application integration agent for providing content to an application platform. The content can include a reference to the discovery server, and the data request can be based on the reference to the discovery server.

In a further implementation, determining the stable network-level identifier includes extracting the transitory network-level identifier from the data request, and resolving the stable network-level identifier based on IP address allocation records corresponding to the transitory network-level identifier.

In yet another implementation, the system further includes an application integration agent for providing customized content based on the mapping between the application-level identifier and the stable network-level identifier.

In various implementations, the application-level identifier is an HTTP cookie, a UUID, an ODIN, an IFA, or a UDID. The transitory network-level identifier can include an IP address. Further, the stable network-level identifier can be a MAC address, an IMEI, an IMSI, or other stable identifier.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

The present invention is illustrated by way of example and not by way of limitation in accompanying drawings in which like references indicate similar elements. It should be noted that references to "an" or "one" or "some" embodiment(s) in this disclosure are not necessarily to the same embodiment, and such references mean at least one.

Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and multiple hosts can be connected by one or more networks.

As used herein, the terms "engine" and "server" may refer to software, firmware, hardware, or any other component that is used to effectuate a purpose. The engine or server may include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program may include calls to hardware components (such as input/output (I/O) devices), which may require the execution of drivers. The drivers may or may not be considered part of the engine or server.

As used herein, the term "database" is used broadly to include any known or convenient means for storing data, whether centralized or distributed, relational or otherwise.

As used herein, the term "mobile device" may be, but is not limited to, a cell phone, such as an Apple iPhone, a portable electronic device, such as an Apple iPod Touch, Apple iPad, Microsoft Surface, and a mobile device based on the Google Android operating system, a smart watch, smart glasses, and any other portable electronic device that includes software, firmware, hardware, or a combination thereof that is capable of providing the functionality described herein. Typical components of the mobile device may include, but are not limited to, persistent memories like flash read-only memory (ROM), random access memory like static random-access memory (SRAM), a camera, a battery, liquid crystal display (LCD) driver, a display, a cellular antenna, a speaker, a Bluetooth circuit, and Wi-Fi circuitry, where the persistent memory may contain programs, applications, and/or an operating system for the mobile device.

As used herein, the term computer can be but is not limited to, a personal computer or a laptop, such as a Hewlett-Packard Pavilion desktop computer, Dell Ultrabook laptop, Apple MacBook laptop, or other electronic device based on an operating system such as Microsoft Windows or Apple OS X, and any other electronic device that includes software, firmware, hardware, or a combination thereof that is capable of providing the functionality described herein. Typical components of the computer may include but are not limited to persistent memories like flash ROM, random access memory like SRAM, a battery, a hard-disk or solid-state drive, a display adapter, a network controller used for connecting to a fixed-line network, a speaker, a Bluetooth circuit, and Wi-Fi circuitry, where the persistent memory may contain programs, applications, and/or an operating system for the computer.

Various implementations of the systems described herein can use appropriate hardware or software; for example, certain components can execute on server class computers that have sufficient memory, data storage, and processing power and that run a server class operating system (e.g., Oracle® Solaris®, GNU/Linux®, and the Microsoft® Windows® family of operating systems) or other hardware (e.g., mobile devices, computers, etc.) capable of running an operating system such as the Microsoft Windows® operating systems, the Apple OS X® operating systems, the Apple iOS® platform, the Google Android™ platform, the Linux® operating system and other variants of UNIX® operating systems, and the like. The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

In various implementations, the devices include a web browser, client software, or both. The web browser allows the device to request a web page or other downloadable program, applet, or document (e.g., from a server) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the device manually requests a web page from the server. Alternatively, the device automatically makes requests with the web browser. Examples of commercially available web browser software are Microsoft® Internet Explorer®, Mozilla® Firefox®, and Apple® Safari®.

In some implementations, the devices include client software. The client software provides functionality to the device that provides for the implementation and execution of the features described herein. The client software can be implemented in various forms, for example, it can be in the form of a web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a "plug-in" to the web browser or to another framework or operating system. Any other suitable client software architecture, including but not limited to widget frameworks and applet technology can also be employed with the client software.

Communication among servers, computers, mobile devices, and other components can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are contemplated. The network can carry TCP/IP protocol communications, and HTTP/HTTPS requests made by a web browser, and the connection between the user devices and servers can be communicated over such TCP/IP networks. Other communication protocols are contemplated.

Method steps of the techniques described herein can be performed by one or more programmable processors executing one or more computer programs to perform functions by operating on input data and generating output. Method steps can also be performed by, and the modules can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store instructions that, when executed by a processor, form the modules and other components described herein and perform the functionality associated with the components. The processor and the memory can be supplemented by, or incorporated in special purpose logic circuitry.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 1:
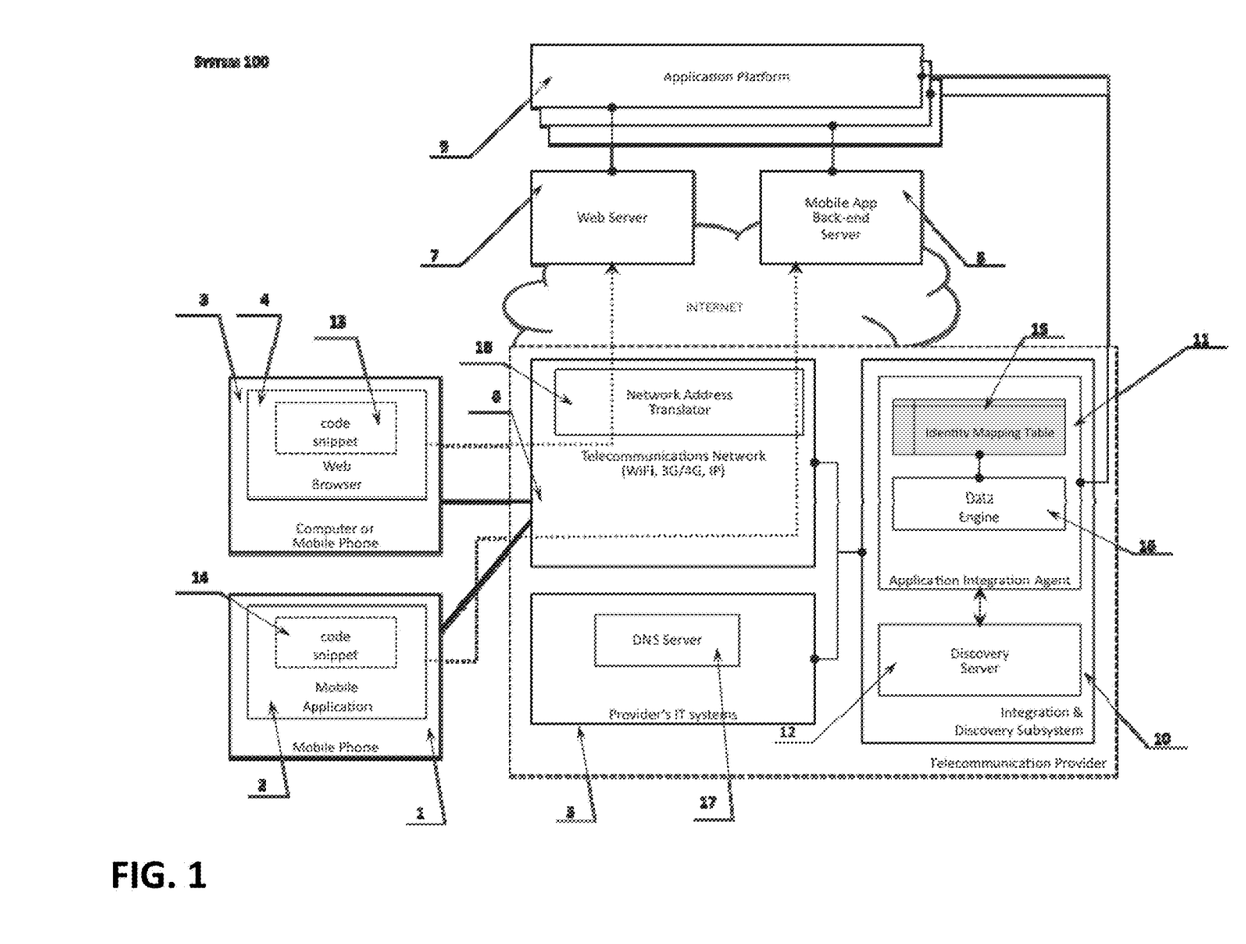
FIG. 1 is a diagram depicting a system architecture according to an implementation of the invention.

An exemplary embodiment of the system is illustrated in FIG. 1. A system 100 is provided that includes the following elements: a collection of mobile phones (1) and computers (3), jointly referred to as "devices," executing mobile applications (2) or web browsers (4). Devices are provided access to the Internet by connecting to the service provider's (5) telecommunication network (6) using one or more of multiple access technologies. In one embodiment of the present invention, the devices (1, 3) are connected using Wi-Fi technology. In another embodiment of the invention, the devices (1, 3) can be connected using 3G or 4G cellular technologies such as GSM, UMTS or Wideband Code Division Multiple Access (WCDMA).

The web browser (4) requests an HTML web page by establishing an HTTP connection over the Internet to the web server (7). Similarly, the mobile application (2) submits a request to and receives a response from the back-end server (8) using one of the transport protocols and data serialization technologies. As a non-limiting example, the application (2) may use an HTTP-based protocol with queries and responses encoded in HTML or Extensible Markup Language (XML). When the web browser (4) sends its initial request to a web server (7), the web server (7) has the option of providing the browser (4) with an unique HTTP cookie that is stored by the browser (4) and will be included in all subsequent HTTP requests to the same web server (7), which will use it to determine that the requests are coming from the same user.

When a mobile application (2) first initiates execution, it may allocate or calculate a unique device or user identifier using one of the methods provided by the mobile operating systems. As a non-limiting example, applications (2) executing on the Android operating system may use ANDROID_ID or UUID, those running on Apple iOS may utilize IFA, and some or all applications (2) may choose to create application-specific accounts for each user and utilize a unique application-specific user ID. The application (2) then includes the identifier in its protocol queries to the back-end server (8), who uses the identifier to distinguish different users and provide customized data. In its normal operation, the role of the telecommunication network (6) of the provider (5) may include routing packets that encapsulate application-level protocol packets (such as HTTP) from devices (1, 3) to servers (7, 8) and back, and the network (6) may not have visibility of the application-level identifiers and may not employ any mechanisms to establish a relationship between them and the network-level device identifiers of the user, such as the MAC address, mobile phone IMEI or IMSI, or other stable identifier. For example, an operator may provide a salted hash of a MAC address as a network-level device identifier.

The present invention introduces an Integration and Discovery Subsystem (10) that includes one or more Application Integration Agents (AIA) (11) and one or more Discovery Servers (DS) (12). The AIA (11) integrates with the Application Platform (9) that provides content to the web and mobile applications (2, 4). In one embodiment of the invention, the Application Platform (9) is an advertising platform that integrates with the web server (7) and/or the mobile app back-end server (8) and dynamically supplies Internet advertising units to the servers (7, 8) in the form of snippets of dynamically interpreted code (13, 14) that are provided to the client web browser (4) or mobile application (2) as part of a web page or response to the data query, and are dynamically rendered by the browser (4) and the mobile application (2), triggering additional protocol requests to fetch the components referenced in the code snippet. As a non-limiting example, the code snippets may be represented as HTML code snippets dynamically rendered by the web browser (4) or an HTML rendering library in the application (2), and individual components may be represented by images or JavaScript code obtained through HTTP requests. In another embodiment of the invention, the Application Platform (9) provides the servers (7, 8) with dynamically generated content describing certain content of user interest (video, music, books, as non-limiting examples) similarly encoded in HTML snippets or any other dynamically interpreted languages (such as XML) that triggers the client web or mobile application (2, 4) to request images or other scripts through additional protocol requests.

Through integration with the Application Platform (9), the AIA (11) is able to participate in data transactions initiated by the web and mobile applications (2, 4) and provide units of content or other data that may subsequently be included by the Application Platform (9) in its responses to the applications (2, 4). This serves two goals: (a) establishment of the initial mapping between the application-level identities and network-level device or user identifiers, and (b) subsequent customization of application user data content, based on the Identity Mapping Table (IMT) (15) maintained by the AIA (11) and user analytics data created by the Data Engine (16), by utilizing information inside the provider's network (6) and IT systems (5).

Figure 2:
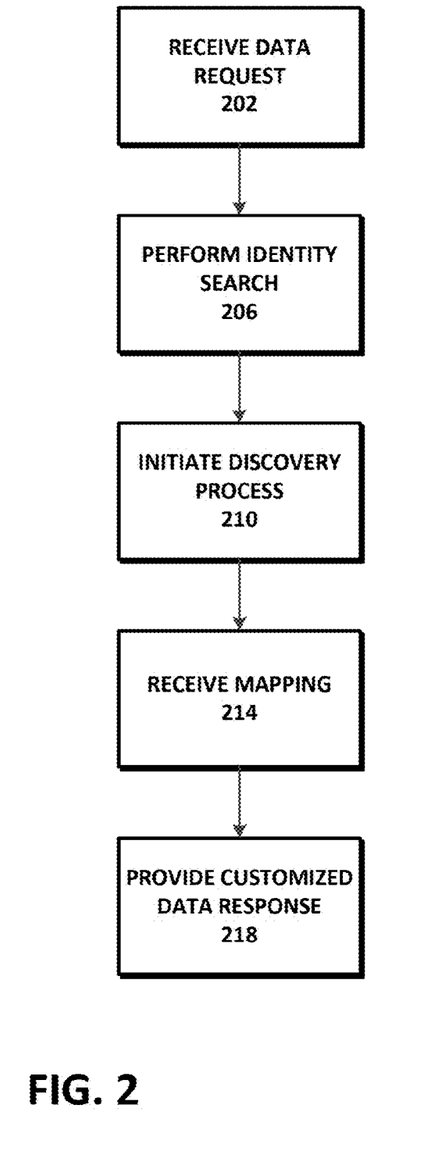
FIG. 2 is a flowchart depicting an example method for determining a relationship between an application-level identifier and a network-level identifier according to an implementation of the invention.

In one embodiment, referring to FIG. 2, in the initial state, the AIA's Identity Mapping Table (15) is empty. When the AIA (11) receives a request for data from the Application Platform (9) (STEP 202), it performs a search operation in the IMT (15) for the user identity provided in the request (web cookie or mobile application identifier) (STEP 206). The result of the search for the first transaction will be negative, and the AIA (11) initiates the discovery process described below (STEP 210). As a result of the discovery process, the AIA (11) obtains mapping between the application identity and the network-level identifier from the Discovery Server (12) (STEP 214). Subsequently, the AIA (11) uses the mapping to provide a customized data response to the Application Platform (9) (STEP 218).

The present invention includes three equally valid exemplary embodiments of methods for the discovery mechanism. It is to be appreciated, however, that other methods for the discovery mechanism are contemplated.

Figure 3A:
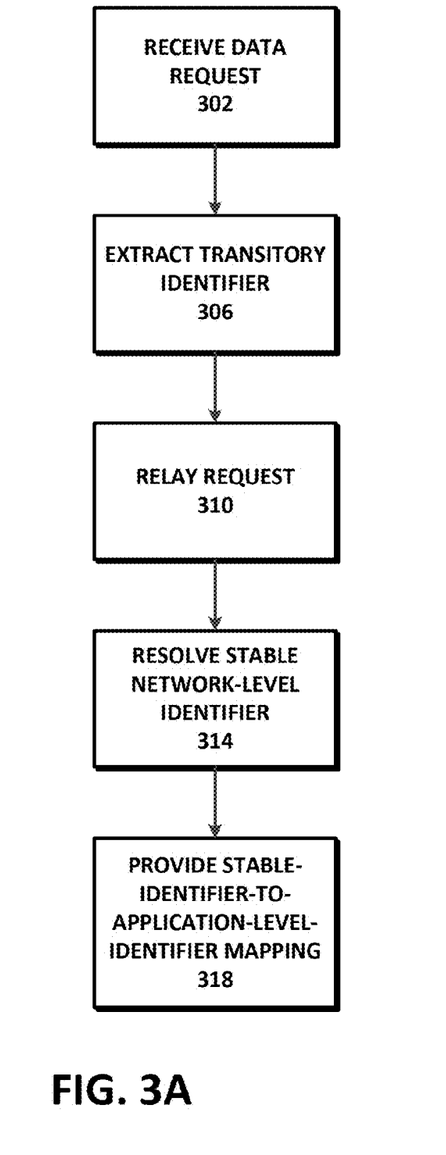
FIGS. 3A-3C are flowcharts depicting example discovery processes according to implementations of the invention.

In Method 1, shown in FIG. 3A, hosting of the data units provided by the Application Platform (9) to the application (2, 4) is not modified (i.e., they are still hosted and served by the Application Platforms (9)). Instead, the provider's DNS server (17) is configured to resolve the symbolic name of the server referenced in the data elements provided to the applications (2, 4) with the IP address of the Discovery Server (12). The Discovery Server (12) receives the data request from the application (2, 4) which includes the application identity (included by default by the application or provided by the AIA (11) as part of the data unit description) (STEP 302), establishes the mapping of this identity to the IP address of the device (1, 3) by extracting the source IP address from the data request (STEP 306), and relays the request to the original data server using the application-specific proxy functionality (STEP 310). The application-identity-to-IP-address mapping is further resolved to the stable network identifier of the device (1, 3), such as MAC address, IMEI, or IMSI, or other stable identifier, by analyzing the corresponding IP address allocation records that are usually available in the provider's network (6) (STEP 314). The final mapping is supplied to the AIA (11) server (STEP 318).

Figure 3B:
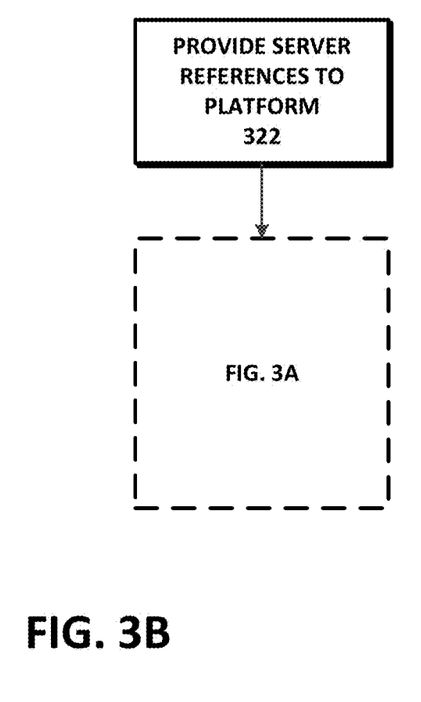

In Method 2, the AIA (11) actively participates in the Application Platform's (9) data selection process and provides it with references to the data units that are hosted by the Integration and Discovery Subsystem (10) (STEP 322). The references are constructed so that they are received by the Discovery Server (12) and include the value of the application-level identity. The rest of the discovery process can be the same as with Method 1. In one embodiment of the invention, where the Application Platform (9) is an advertising platform, the AIA (11) provides the Platform (9) with an HTML code snippet that includes a URL to the image file containing the ad creative with the Discovery Server (12) as the server name. When the client application renders the HTML snippet, it initiates the request for the image file that is received by the Discovery Server (12) inside the provider's premises.

Figure 3C:
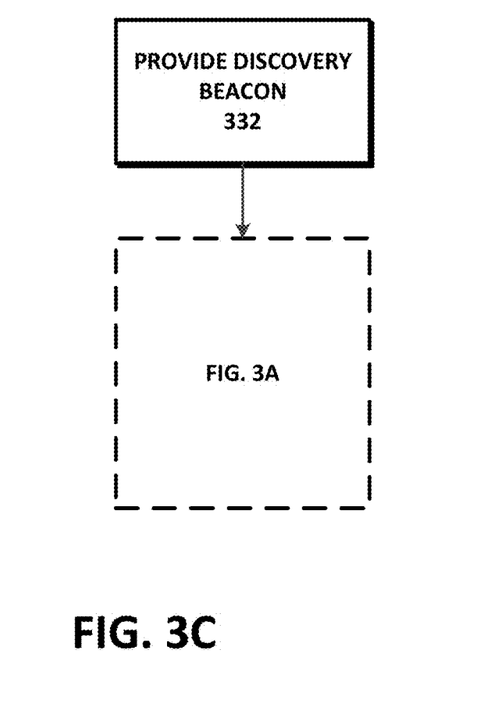

In Method 3, the data units can be hosted by the Application Platform (9) itself (as in Method 1) or by an affiliated platform outside the provider's premises; however, the AIA (11) also supplies an additional portion of the code that includes a reference to a fake data unit at the Discovery Server (12) (hereby referred to as the Discovery Beacon) (STEP 332). The beacon integrates the application-level identity provided in the original request. The rest of the discovery process can be the same as with Method 1. In one embodiment of the invention, where the Application Platform (9) is an advertising platform, the data response from the AIA (11) is an HTML snippet for the recommended advertisement that includes a web beacon. As a non-limiting example, the discovery web beacon inside the HTML snippet is implemented as a reference to an invisible image targeted at the Discovery Server (12), as illustrated in the code fragment below. The URL used in the beacon integrates the application-level identity.

```
<!-- Discovery beacon first -->
<img src="http://ds.xtele.com/mapid?appid=7651276512765"
width="0" height="0">
<!-- The creative HTML snippet is below-->
<a href="http://www.cinarra.com" target="_blank"> <img
width="728" height="90"
border="0" src="http://adsrv.cinarra.com/1234567/728x90Image.JPG">
</a>
```

In another implementation, instead of or in addition to including the application-level identifier (e.g., appid) in the beacon and in a lookup table maintained by the Discovery Server (12), a temporary or otherwise short-lived unique transaction identifier can be substituted or added to the application-level identifier. This can provide additional security in the event, for example, that the application-level identifier is comprised.

One aspect of the Discovery Process includes capturing the IP address of the user before the request goes through the Network Address Translator (NAT) (18). The role of NAT (18) is to translate a larger number of private IP addresses utilized inside the provider's network (6) to a smaller pool of public IP addresses. NAT (18) enforces sharing of a single public IP address among multiple users and devices, hence making it impossible to use a public IP address for device identification purposes. In one implementation, the Discovery Server (12) is positioned inside the provider's private address domain. The invention supports multiple private IP address domains, if used by the provider, by utilizing multiple instances of the DS (12) or a single instance that maintains separate connection to each individual private IP address domain and distinguishes private IP addresses with the same value from different domains.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

The invention claimed is:

1. A system for determining a relationship between an application-level identifier and a network-level identifier, the system comprising:
   one or more computers including a mapping server inside a telecommunications provider network, the one or more computers programmed to perform operations comprising:
   causing a data request for data stored on a server external to the telecommunications provider network to be directed to the mapping server;
   receiving the data request at the mapping server, the data request comprising the application-level identifier and a transitory network-level identifier associated with a requesting client device;
   determining, by the mapping server, a stable network-level identifier for the client device based on the transitory network-level identifier by:
   extracting the transitory network-level identifier from the data request; and
   resolving the stable network-level identifier based on IP address allocation records available within the telecommunications provider network and corresponding to the transitory network-level identifier;
   mapping, by the mapping server, the application-level identifier to the stable network-level identifier; and
   wherein the transitory network-level identifier comprises an IP address of the client device, and the stable network-level identifier is selected from the group consisting of a MAC address, an IMEI, and an IMSI of the client device.

2. The system of claim 1, further comprising an application integration agent for providing content to an application platform, the content comprising a reference to the external server.

3. The system of claim 2, wherein the reference to the external server resolves to an address associated with the mapping server.

4. The system of claim 3, wherein the operations further comprise relaying the data request to the external server.

5. The system of claim 1, further comprising an application integration agent for providing content to an application platform, the content comprising a reference to the mapping server.

6. The system of claim 5, wherein the data request is based on the reference to the mapping server.

7. The system of claim 1, further comprising an application integration agent for providing customized content based on the mapping between the application-level identifier and the stable network-level identifier.

8. The system of claim 1, wherein the application-level identifier is selected from the group consisting of an HTTP cookie, a UUID, an ODIN, an IFA, and a UDID.

9. A method of determining a relationship between an application-level identifier and a network-level identifier, the method comprising:
   causing a data request for data stored on a server external to a telecommunications provider network to be directed to a mapping server inside the telecommunications provider network;
   receiving the data request at the mapping server, the data request comprising the application-level identifier and a transitory network-level identifier associated with a requesting client device;
   determining, by the mapping server, a stable network-level identifier for the client device based on the transitory network-level identifier by:
   extracting the transitory network-level identifier from the data request; and
   resolving the stable network-level identifier based on IP address allocation records available within the telecommunications provider network and corresponding to the transitory network-level identifier;
   mapping, by the mapping server, the application-level identifier to the stable network-level identifier; and
   wherein the transitory network-level identifier comprises an IP address of the client device, and the stable network-level identifier is selected from the group consisting of a MAC address, an IMEI, and an IMSI of the client device.

10. The method of claim 9, further comprising providing content, by an application integration agent, to an application platform, the content comprising a reference to the external server.

11. The method of claim 10, wherein the reference to the external server resolves to an address associated with the mapping server.

12. The method of claim 11, further comprising relaying, by the mapping server, the data request to the external server.

13. The method of claim 9, further comprising providing content, by an application integration agent, to an application platform, the content comprising a reference to the mapping server.

14. The method of claim 13, wherein the data request is based on the reference to the mapping server.

15. The method of claim 9, further comprising providing customized content, by an application integration agent, based on the mapping between the application-level identifier and the stable network-level identifier.

16. The method of claim 9, wherein the application-level identifier is selected from the group consisting of an HTTP cookie, a UUID, an ODIN, an IFA, and a UDID.

* * * * *